(12) United States Patent
Kismir et al.

(10) Patent No.: US 7,909,358 B2
(45) Date of Patent: Mar. 22, 2011

(54) AIR-BAG

(75) Inventors: Altay Kismir, Tilbury (CA); Conrad Fricke, München (DE); Jonathan Moore, Farnham (GB); Paul Jeram, Portsmouth (GB)

(73) Assignee: Autoliv Development AB, Vargarda (SE)

( * ) Notice: Subject to any disclaimer, the term of this patent is extended or adjusted under 35 U.S.C. 154(b) by 858 days.

(21) Appl. No.: 10/556,866

(22) PCT Filed: May 10, 2004

(86) PCT No.: PCT/SE2004/000706
§ 371 (c)(1),
(2), (4) Date: Oct. 15, 2009

(87) PCT Pub. No.: WO2004/101328
PCT Pub. Date: Nov. 25, 2004

(65) Prior Publication Data
US 2006/0244252 A1    Nov. 2, 2006

(30) Foreign Application Priority Data
May 14, 2003    (GB) .................................. 0311103.6

(51) Int. Cl.
*B60R 21/213*    (2006.01)

(52) U.S. Cl. .................................................. 280/730.2
(58) Field of Classification Search .............. 280/730.2, 280/736, 741, 742
See application file for complete search history.

(56) References Cited

U.S. PATENT DOCUMENTS

| | | | |
|---|---|---|---|
| 6,293,581 B1 * | 9/2001 | Saita et al. ................ | 280/730.2 |
| 6,318,754 B1 * | 11/2001 | Einsiedel et al. ............ | 280/736 |
| 7,147,244 B2 * | 12/2006 | Takahara .................... | 280/730.2 |
| 7,654,567 B2 * | 2/2010 | Taylor et al. ................ | 280/740 |
| 7,669,894 B2 * | 3/2010 | Leo et al. ..................... | 280/742 |
| 2004/0104561 A1 * | 6/2004 | Maertens ..................... | 280/730.2 |
| 2007/0035112 A1 * | 2/2007 | Takahara .................... | 280/730.2 |
| 2007/0257475 A1 * | 11/2007 | Fukuda et al. ............... | 280/736 |
| 2010/0207369 A1 * | 8/2010 | Okimoto et al. ............. | 280/741 |

* cited by examiner

*Primary Examiner* — Paul N Dickson
*Assistant Examiner* — Karen A Beck
(74) *Attorney, Agent, or Firm* — Brinks Hofer Gilson & Lione

(57) ABSTRACT

An air-bag in the form of an air-bag is disclosed, having an upper edge provided with mounting tabs to mount the upper edge to a motor vehicle. The upper edge of the air-bag is also provided with a gas inlet throat at a position between the ends of the upper edge. The gas inlet throat is configured to receive an end part of an elongate gas generator, and the upper edge of the air-bag is provided with a gas generator retainer, in the form of a loop to engage part of the gas generator.

5 Claims, 2 Drawing Sheets

AIR-BAG

Figure 1:
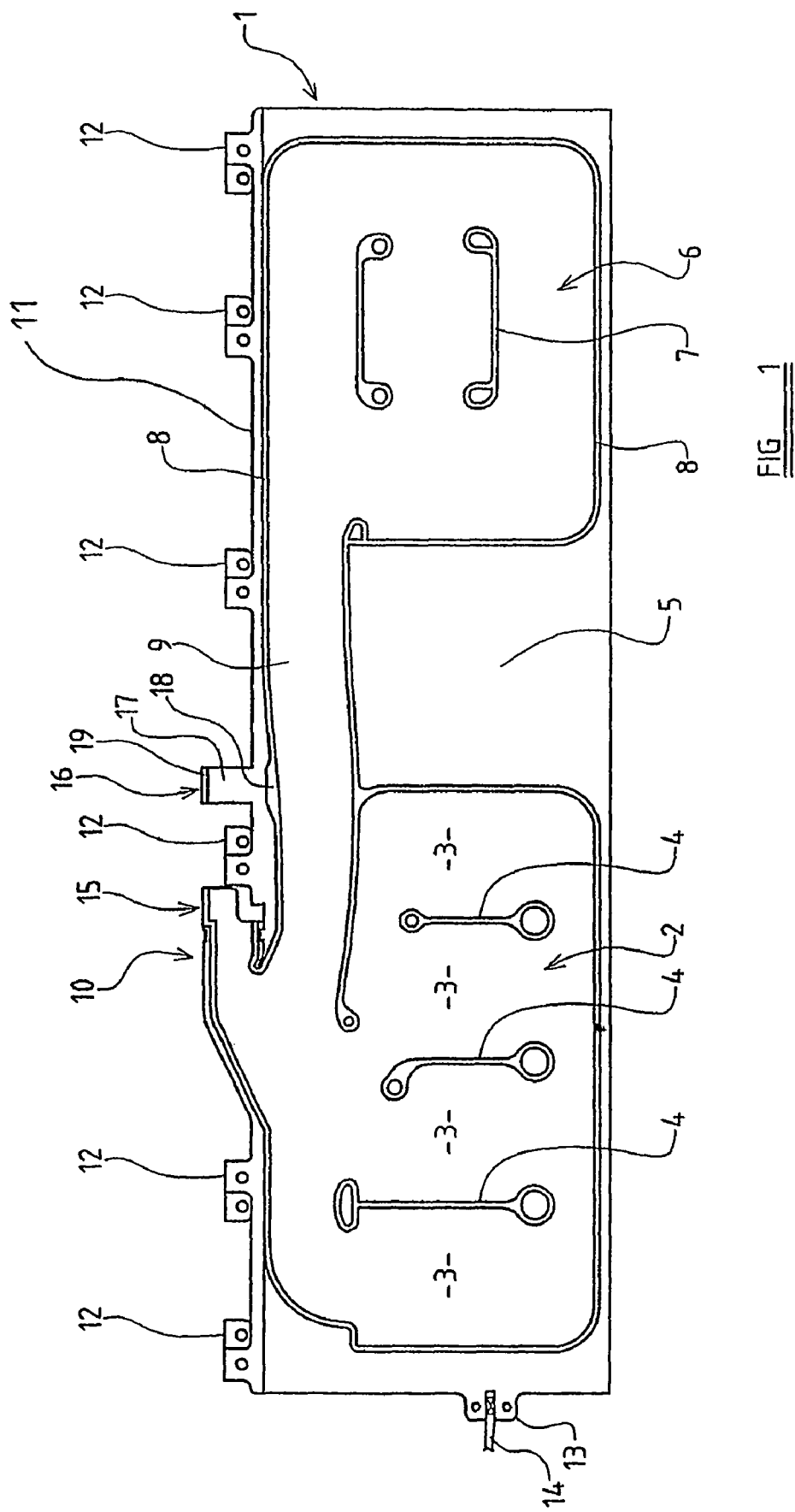

THE PRESENT INVENTION relates to an air-bag and more particularly relates to an air-bag in the form of an inflatable curtain.

It has been proposed to provide an air-bag in the form of an inflatable curtain. The air-bag is initially mounted within the roof of a motor vehicle at a position over the doors and, in response to a signal from an appropriate sensor, is inflated to form a curtain which extends between the occupants of the vehicle and the side windows of the vehicle.

Various designs of inflatable curtain have been proposed, and in some designs, the gas generator is connected to an inlet which is located at a position intermediate the ends of the upper edge of the air-bag. The gas inlet may be substantially centrally located or may be positioned slightly off-set from the centre of the air-bag. However, the provision of the inlet in a mid-region of the upper edge of the air-bag facilitates the swift inflation of the air-bag in response to the said signal.

In some prior proposed arrangements the gas inlet for the air-bag is in the form of a substantially "L" shaped throat, which can receive the end of a generally cylindrical gas generator. The gas generator may be provided with a deflector provided at the end of the gas generator to deflect gas so that it flows downwardly into an inflatable part of the air-bag.

When the gas generator is attached to an inlet throat of this type, there is a gap between the opening of the gas inlet and the periphery of the inflatable curtain. It has been found that a high load is applied to the part of the inflatable curtain defining this gap during deployment of the air-bag. Here it is to be understood that an inflatable curtain should, ideally, be inflated within a very brief period of time following receipt of the said signal, and thus a typical gas generator intended for use with an inflatable curtain generates a very aggressive flow of gas.

The present invention seeks to provide an improved air-bag.

Accordingly, the present invention provides an air-bag in the form of an inflatable curtain, the inflatable curtain having an upper edge provided with mounting tabs to mount the upper edge to a motor vehicle, the upper edge also being provided, at a point intermediate the ends thereof, with a gas inlet throat configured to receive an end part of an elongate gas generator, the upper edge of the air-bag being provided with a gas generator retainer to engage part of the gas generator.

Preferably, the gas generator retainer is in the form of a loop.

Preferably the loop is a projection tab of fabric extending beyond the upper edge of the inflatable curtain, the tab defining an aperture.

Advantageously the tab is of two super-imposed layers of fabric.

Conveniently the edges of the layers of fabric are welded together.

Advantageously, the air-bag is provided in combination with a gas generator, the loop being dimensioned to be received around the gas generator.

Conveniently, the gas generator has, or is enclosed by, a cylindrical housing, the loop engaging the cylindrical housing but being capable of axial movement relative to the cylindrical housing.

Figure 2:
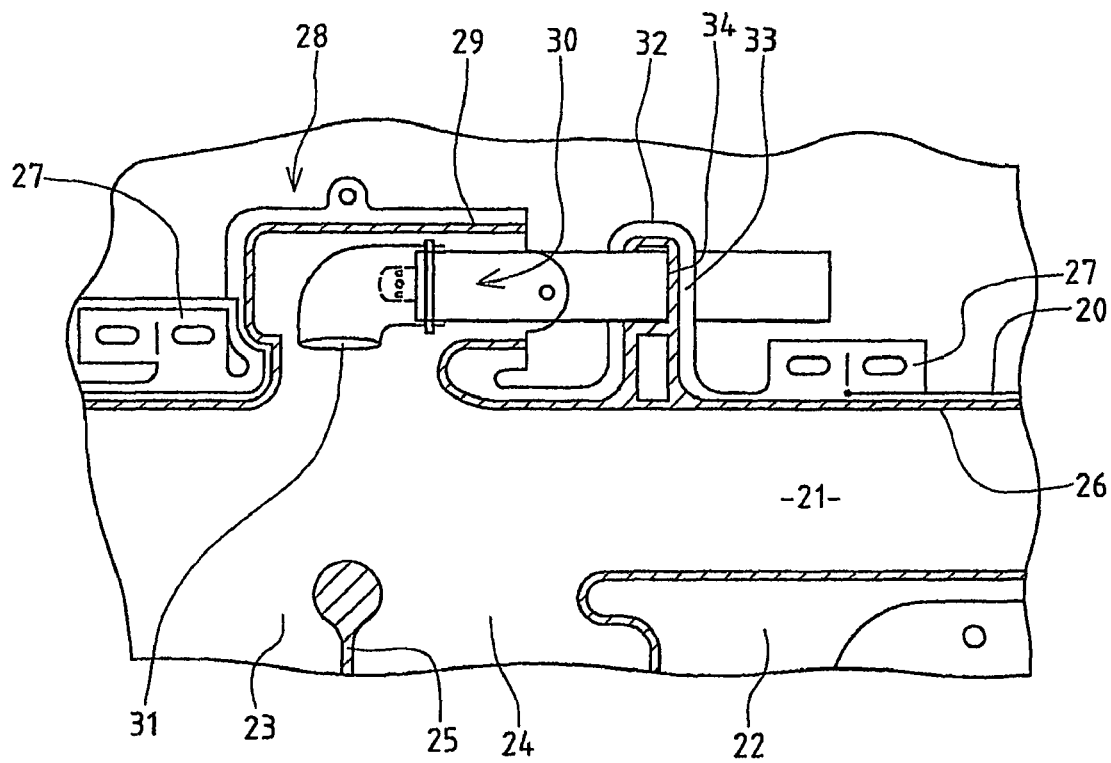
Figure 3:
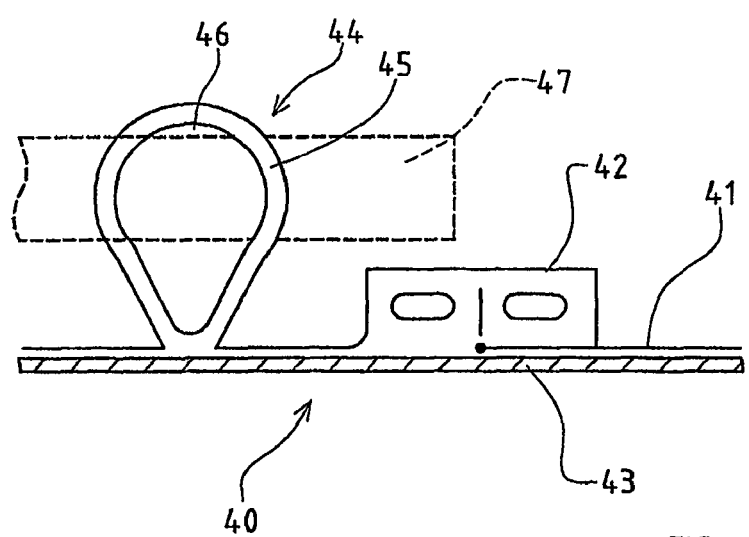

In order that the invention may be more readily understood, and so that further features thereof may be appreciated, embodiments of the invention will now be described, by way of example, with reference to the accompanying drawings in which:

FIG. 1 is a diagrammatic view of one form of inflatable curtain in accordance with the invention, FIG. 2 is an enlarged partial view, partly in phantom, of a second embodiment of the invention, and FIG. 3 is an enlarged partial view, partly in phantom, of a third embodiment of the invention.

Referring initially to FIG. 1 of the accompanying drawings, an air-bag 1 in the form of an inflatable curtain is of generally rectangular form. The air-bag is made of two superimposed layers of fabric interconnected by seams which will be described below. The seams may be stitched seams, but preferably the seams are integrally formed with the air-bag in a one-piece-weaving process, as known in the art.

The air-bag 1 has a first inflatable region 2 which is divided into a plurality of inflatable cells 3 by means of seams 4. The inflatable region 2 is separated, by an uninflatable region 5, from a second inflatable region 6. The second inflatable region 6 is sub-divided by seams 7. The inflatable region is surrounded by a peripheral seam 8 which joins the two layers of fabric forming the air-bag. A small part of the fabric layers extends beyond the seam 10.

A gas flow duct 9 extends from an upper part of the second inflatable region 6, across the top of the uninflatable region 5 and extends into the upper part of the first inflatable region 2. The first inflatable region 2 is provided with a "L" shaped gas inlet throat 10 which extends up above the uppermost edge 11 of the inflatable curtain.

The uppermost edge 11 of the inflatable curtain is provided with a plurality of spaced apart mounting tabs 12 which, when the inflatable curtain is mounted within a motor vehicle, engage appropriate mounts provided within the motor vehicle. One side edge of the inflatable curtain is provided with a protruding lug 13 to which, a tether or strap 14 is mounted.

The inlet throat 10 defines a cylindrical inlet portion 15 configured to receive a terminal part of a cylindrical gas generator (not shown in FIG. 1 for reasons of clarity) having an axis which extends parallel with the uppermost edge 11 of the inflatable curtain. The uppermost edge 11 of the inflatable curtain is provided integrally with a gas generator retainer loop 11, which is a loop adapted to surround the cylindrical gas generator, at a point intermediate its ends, to retain the inflatable curtain relative to the gas generator. The loop 16 is formed from two projections 17 of the fabric layers that extend beyond the peripheral seam 8. The seam 8 may be enlarged 18 for added strength at the base of the projections. The free ends of the projections are interconnected by a further seam 19. The two layers of fabric between the peripheral seam 8 and the further seam 19 may be separated to form the loop 16.

In an alternative embodiment the gas generator retainer loop could be a separate loop attached by stitching or any suitable means to the upper edge 11 of the air-bag.

The gas generator itself will be secured to mounts provided in the motor vehicle and the provision of the gas generator retainer loop 16 will help maintain the integrity of the combination of the gas generator and the inflatable curtain. The provision of the loop as an additional retainer obviates the need for an additional mount to be provided in the motor vehicle, but does serve to re-enforce the air-bag. It is conceivable that the loop may be permitted to move slightly along the gas generator during deployment of the air-bag which may help absorb forces which might be experienced.

FIG. 2 illustrates a modified embodiment of the invention. The embodiment of FIG. 2 is again an air-bag in the form of an inflatable curtain which has been fabricated from two layers of fabric which are interconnected by seams. In FIG. 2, only the upper edge part 20 of an air-bag is illustrated, but it is possible to see part of a gas duct 21 which extends adjacent the upper edge 20, and also part of an uninflatable region 22 and two cells 23, 24 separated by a seam 25 that form part of an inflatable region. The air-bag has a peripheral seam 26.

The upper edge 20 of the air-bag is provided with two spaced apart mounting tabs 26, 27 which are located on opposite sides of a substantially "L" shaped gas inlet throat 28. The gas inlet throat 28 has a cylindrical terminal portion 29 which receives an end part 30 of a gas generator which is of cylindrical form. The gas generator, in the described embodiment, is provided with a gas deflector 31 located within the throat 29 to deflect gas downwardly into the inflatable region and along the gas flow duct 21.

Between the mounting lug 27 and the inlet throat 28, a gas generator retainer in the form of a loop 32 is provided which is formed integrally with the fabric of the air-bag. The loop consists of a projection extending beyond the upper edge 20 of the air-bag. In the projection the two layers of fabric are stitched together, or if the preferred one-piece-weaving process is used, or woven together to form a strong projecting tab at the edges of which, such as edge 33, the two discrete layers of fabric may be discerned. A hole 34 is cut or formed in the part of the tab where the fabric layers are woven or stitched together to form the loop 32.

The retainer loop 32 surrounds the cylindrical gas generator 30 helping to maintain the integrity of the combination of the inflatable curtain and the gas generator in the region of the inlet throat.

In the present Specification "comprises" means "includes or consists of" and "comprising" means "including or consisting of".

In the embodiment of FIG. 3, an air-bag 40 has an upper edge 41 provided with mounting tabs, such as the tab 42, and an L-shaped throat (not shown) equivalent to that of the embodiment of FIG. 2. A peripheral seam 43 extends parallel to the upper edge 41. Part of the super-imposed fabric layers extending beyond the upper edge 41 is cut, for example by laser cutting, to form a loop 44. The loop is formed effectively of a projecting tab 45 of circular shape with a concentric circular aperture 46. As the fabric is laser cut, so the edges of the fabric are heat welded together, providing a strong loop to accommodate the gas generator 47.

The invention claimed is:

1. An air-bag in the form of an inflatable curtain, the inflatable curtain having an upper edge provided with mounting tabs to mount the upper edge to a motor vehicle, the upper edge also being provided, at a point between the ends thereof, with a gas inlet throat configured to receive an end part of an elongated gas generator, the upper edge of the air-bag being provided with a gas generator retainer to engage part of the gas generator, wherein the gas generator retainer is in the form of a loop, and wherein the loop is a projecting tab of fabric extending beyond the upper edge of the inflatable curtain, the tab defining an aperture.

2. An air-bag according to claim 1 wherein the tab is of two super-imposed layers of fabric.

3. An air-bag according to claim 2 wherein the edges of the layers of fabric are welded together.

4. An air-bag according to claim 1 wherein the loop is dimensioned to be received around the gas generator.

5. An air-bag in the form of an inflatable curtain, the inflatable curtain having an upper edge provided with mounting tabs to mount the upper edge to a motor vehicle, the upper edge also being provided, at a point between the ends thereof, with a gas inlet throat configured to receive an end part of an elongated gas generator, the upper edge of the air-bag being provided with a gas generator retainer to engage part of the gas generator, wherein the gas generator retainer is in the form of a loop, wherein the loop is dimensioned to be received around the gas generator, and wherein the gas generator is enclosed by, a cylindrical housing, the loop engages the cylindrical housing but is capable of axial movement relative to the cylindrical housing.

* * * * *